MAGNETIC SWITCHING SYSTEMS

Filed May 7, 1956 2 Sheets-Sheet 1

INVENTOR.
HEWITT D. CRANE
BY
Morris A. Rabkin
ATTORNEY

July 21, 1959 H. D. CRANE 2,896,194
MAGNETIC SWITCHING SYSTEMS
Filed May 7, 1956 2 Sheets-Sheet 2

INVENTOR.
HEWITT D. CRANE
BY
Morris A. Rabtin[illegible]
ATTORNEY

United States Patent Office 2,896,194

Patented July 21, 1959

2,896,194

MAGNETIC SWITCHING SYSTEMS

Hewitt D. Crane, Menlo Park, Calif., assignor to Radio Corporation of America, a corporation of Delaware Application May 7, 1956, Serial No. 582,986

20 Claims. (Cl. 340—174)

This invention relates to magnetic systems, and particularly to improved magnetic switching or decoding systems.

Certain of the magnetic switching or decoding systems of the prior art are arranged to provide an output from one or more selected magnetic elements thereof, in accordance with a combination of selecting currents simultaneously applied to these magnetic elements.

Examples of prior-art magnetic switching or decoding systems may be found in an article written by Jan A. Rajchman, published in vol. XIII of the RCA Review, June 1952, and in Patent No. 2,691,153, issued to Rajchman et al. on October 5, 1954, for Magnetic Switching System. Problems of generating and synchronizing the combination of selecting currents may be encountered in such systems. These problems become more difficult of solution in systems of larger size and lower access time than in other systems.

In a copending application filed by the present applicant, entitled "Magnetic Systems," filed February 29, 1956, Serial No. 568,569, now Patent No. 2,851,678, improved magnetic switching or decoding systems are described which obviate or reduce the above-noted problems. In these improved systems, selection of at least one of the switch cores is effected by steering a selecting current through at least one current path in each of a plurality of sets of current paths linked to the switch cores. The selecting current is steered through desired ones of the paths by means of a plurality of control devices, one in each current path. Each of these control devices may include an electronic device or a combination of a magnetic core and a diode rectifier.

The present invention is an improvement over the above-mentioned application in that the steering of the selecting current is controlled solely by magnetic elements connected in the current paths.

It is among the objects of the present invention to provide an improved magnetic switching or decoding system.

Another object of the present invention is to provide an improved magnetic switching or decoding system of a greater reliability than prior systems.

Still another object of the present invention is to provide an improved magnetic switching or decoding system of the type using currents steered with the aid of magnetic elements and having a greater speed of operation than that of prior systems.

According to the invention, a plurality of magnetic elements are linked in a desired combinatorial fashion by current paths arranged in a plurality of sets, the paths of a set being connected in parallel with each other, and the sets being connected in series with each other; and each path of a set has a separate magnetic control device, preferably a transfluxor, which may be operated selectively in a direction to prevent or to permit a steered current to flow in its path. A combination of input signals applied to the control devices controls the relative impedances of the control devices in each set of current paths. The steered current, which may be supplied by a single current source, then flows serially through different ones of the paths in accordance with different combinations of input signals.

The invention will be understood more fully from the following description when read in connection with the accompanying drawings wherein.

Figure 1:
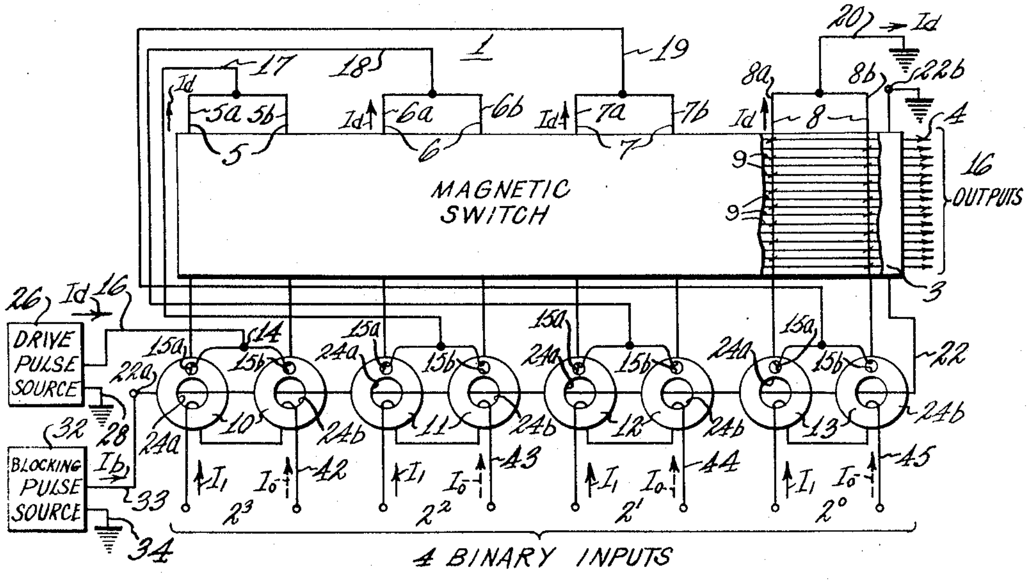
Fig. 1 is a schematic diagram of one embodiment of the invention in which each path is coupled to a two-apertured transfluxor, and in which each path and its transfluxor are paired respectively wtih another path and its transfluxor.

In Fig. 1, a magnetic system 1 includes a magnetic switch 3 having four binary inputs $2^0$–$2^3$ and sixteen separate outputs 4. The switch 3 may be arranged similarly to the system described in Fig. 3 of the aforementioned article by Jan A. Rajchman. Four sets of current paths are linked to the sixteen switch cores of the switch 3 and may be, for example, the four pairs 5–8 of selecting windings *5a*, *5b*, *6a*, *6b*, *7a*, *7b*, *8a*, and *8b*. The pairs 5–8 of selecting windings are linked to the switch cores of the switch 3 in a desired combinatorial fashion. For example, the paths *5a* and *5b* may link alternate halves of the sixteen switch cores; the paths *6a* and *6b* may link alternate fourths of the sixteen switch cores; the paths *7a* and *7b* may link alternate eighths of the switch cores, and the paths *8a* and *8b* may link alternate ones of the sixteen switch cores. For convenience of drawing, the switch 3 is partially broken away to indicate the linkage of the paths *8a* and *8b* to the switch cores 9. Each of the switch cores 9 is represented by a straight, horizontal line. The intersection of a path with any one of the switch cores 9 is indicated by a short, oblique line intersecting the path line and the horizontal line. Thus, beginning with the top switch core 9, the path *8a* links every other one of the switch cores 9; and beginning with the second switch core from the top, the path *8b* links every other one of the switch cores 9.

Four pairs 10–13 of two-apertured transfluxors 10*a*, 10*b*, 11*a*, 11*b*, 12*a*, 12*b*, 13*a*, and 13*b* are provided. Each of the transfluxors 10*a*–13*b* has a relatively small diameter aperture 15 and a relatively large diameter aperture 24. Each of the two-apertured transfluxors 10*a*–13*b* may be one of the known transfluxor devices such, for example, as are described in an article by Jan A. Rajchman and Arthur W. Lo, entitled "The Transfluxor," published in the Proceedings of the I.R.E., March 1956, pp. 321–332. Each different selecting windings *5a*–*8b* of the pairs 5–8 is linked through a different one of the smaller apertures of the pairs 10–13 of transfluxors 10*a*–13*b*.

The selecting winding *5a*–*8b* of each pair 5–8 is connected in parallel with the other winding of the same pair in a closed loop. The four parallel-connected pairs 5–8 of selecting windings are connected in series with each other in a series circuit by means of the conductors 17—19. A conductor 16 connects one terminal of the series circuit at the junction point 14 to one output of a drive pulse source 26. The drive source 26 may be any suitable known source arranged to furnish drive pulses to the series circuit. The other output terminal 28 of the drive source 26 is connected to a common reference source, indicated in the drawing by the conventional ground symbol. A conductor 20 connects the series circuit at its other terminal to the common ground.

A blocking coil 22, for resetting the transfluxors 10–13 and the switch cores of the switch 3, is linked through the larger aperture 24 of each one of the transfluxors 10*a*–13*b* and is also linked to each of the switch cores of the switch 3. One terminal 22*b* of the blocking coil 22 is connected to the common ground. The other terminal 22*a* of the blocking coil 22 is connected to one output of the blocking pulse source 32 by a conductor 33. The other output of the blocking pulse source 32 is connected to the common ground by a conductor 34.

The drive source 26 is used for applying a drive current to the series circuit. The drive source 26 and the blocking source 32 are preferably constant-current sources, such as pentode tubes. The blocking source 32 is used for applying a blocking current to return the transfluxors 10*a*–13*b* to their blocked condition and to reset any of the cores of the switch 3.

A different one of the four setting coils 42–45 is linked through the two blocking apertures 24*a*, 24*b* of each different pair 10–13 of transfluxors. A setting current $I_1$ or a setting current $I_0$ may be applied selectively to respective ones of the setting coils 42–45. The setting current $I_1$ flows in one direction, as indicated by the solid arrow in a setting coil 42–45, and the setting current $I_0$ flows in the opposite direction, as indicated by the dotted arrow. The directions of current flow are assumed to be in the conventional sense. The setting current $I_1$ may correspond, for example, to a binary one signal, and the setting current $I_0$ may correspond to a binary zero signal. When a setting current $I_1$ is applied to a setting coil, the left-hand (as viewed in the drawing) transfluxor of a pair is placed in its set condition. When the setting current $I_0$ is applied to a setting coil, the right-hand transfluxor of a pair is placed in its set condition. The set and blocked conditions of a transfluxor are described hereinafter in connection with Figs. 2 and 3.

Assume that all the transfluxors are initially blocked by a blocking current pulse $I_b$ through the blocking coil 22. The schedule of operation for the system of Fig. 1 may be a cycle comprising, first, setting one transfluxor in each pair in accordance with a binary input signal; second, applying a drive current $I_d$ which is steered in a series circuit through one winding of each pair which is linked to a blocked transfluxor; and, third, applying a blocking current $I_b$ to the blocking coil 22 which returns all the previously set transfluxors to their blocked condition and which also returns any selected one of the switch cores of the switch 3 to its initial remanent state.

Assume, for example, that a setting current $I_0$ is applied to each of the setting windings 42–45 to set each right-hand transfluxor in each of the pairs 10–13. A subsequent drive pulse $I_d$ from the drive source 26 flows through the left-hand selecting winding in each of the pairs 5–8 of selecting windings and through the conductor 20 to the common ground. The drive current $I_d$ is steered through the left-hand selecting winding of each pair of selecting windings because a relatively high impedance is offered to the drive current by each of the set transfluxors 10*b*, 11*b*, 12*b*, and 13*b* compared to that afforded by the blocked transfluxors 10*a*, 11*a*, 12*a*, and 13*a*, as described more fully hereinafter.

The steered drive current $I_d$ operates to drive the selected switch core of the switch 3 whose binary address corresponds to that of the four binary input signals, from its initial remanent state, say the state "N," to the other state "P," in the manner explained in the said Rajchman article. The switch core thus driven produces an output on the corresponding output lead 4 connected thereto.

After the selected core is thus driven, two different modes of operation are possible in a switching system according to the invention. In a first mode the drive current $I_d$ is terminated when substantially all the flux in the paths about the smaller apertures 15 of the set ones of the transfluxors is reversed. In a second mode of operation the drive current is continued after the flux reversal has been carried out in the set transfluxors.

In the operation of the arrangement of Fig. 1, in accordance with the first mode, at any time subsequent to the drive operation, the blocking pulse source 32 is operated to apply a blocking current $I_b$ (conventional) to the blocking coil 22. The blocking current $I_b$ resets each of the previously set right-hand transfluxors 10*b*–13*b* and returns any driven core of the switch 3 back to its initial remanent state "N." The returned switch core produces an opposite polarity output on its output lead 4 when it is returned to the state "N."

Note that, during the drive operation, substantially all the drive current $I_d$ is made to flow only in those selecting windings coupled to the blocked transfluxors, as explained more fully hereinafter. Also the driven switch core may be reset at any arbitrary time after the drive operation is completed. The above two features are characteristic of the first mode of operation of the switching system of the invention.

Figure 2:
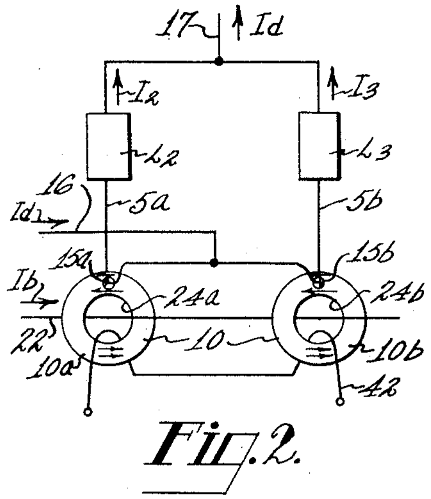
Figs. 2 and 3 are each a schematic diagram of one of the pairs of two-apertured transfluxors of Fig. 1, each diagram illustrating a different operating condition for this pair.
Figure 3:
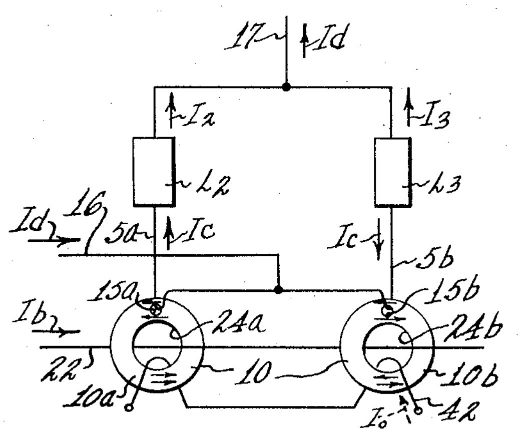

The switching of the drive current through one or the other selecting windings of a pair is further explained in connection with the simplified diagrams of Figs. 2 and 3 and the waveforms of Fig. 4. In Figs. 2 and 3, one of the pairs 10–13 of the transfluxors 10*a*–13*b*, for example the pair 10, is shown separated from the system of Fig. 1.

The loads $L_2$ and $L_3$ may be, for example, the respective groups of switch cores of the switch 3 (Fig. 1) that are linked by the respective selecting windings 5*a* and 5*b* of the pair 5. Assume both the transfluxors 10*a*, 10*b* of the pair 10 are in a blocked condition, due to a current pulse $I_b$ through the blocking coil 22. The flux configuration is indicated by the arrows representing the direction of flux adjacent the apertures of the cores of transfluxors 15*a* and 15*b*. Assume now, for purposes of explanation (notwithstanding that normally one of these transfluxors is set and one reset when this drive current is applied), that a drive current $I_d$ is applied in parallel to the selecting windings 5*a* and 5*b*. Substantially no flux change is produced in the blocked transfluxors 10*a* and 10*b* by magnetizing forces produced by the drive current $I_d$ because one or the other of the narrow legs adjacent their smaller apertures 15*a* and 15*b* is already saturated with flux in the direction in which these magnetizing forces tend to increase flux. For a fuller explanation of transfluxor operation, reference may be made to the above-mentioned Rajchman and Lo article. Accordingly, in the blocked condition, the impedances offered to the drive current $I_d$ by both the transfluxors 10*a* and 10*b* are substantially the same and are relatively small. Therefore, the drive current $I_d$ divides evenly between the two loads $L_2$ and $L_3$ which are connected in parallel to the pair of windings 5*a*–*b* and flows to the common ground. Thus to a close approximation, $$(1) \qquad I_2=I_3=\frac{I_D}{2}$$

where $I_2$ and $I_3$ are respectively the currents flowing in the loads $L_2$ and $L_3$. The even division of the drive current $I_d$ does not tend to drive any one of the switch cores of a switch 3 to the state P for reasons described hereinafter. It should be noted again that in a system arranged as is the system of Fig. 1, normally one of the transfluxors in each of the pairs 10–13 is initially set before the drive current $I_d$ is applied. However, if none of the transfluxors 10–13 is set, the drive current $I_d$ does not cause an output signal to be produced by the switch 3.

Assume, now, that initially both transfluxors 10$a$ and 10$b$ are blocked by a current $I_b$ through the blocking coil 22. Further, assume that the transfluxor 10$b$ is changed to the set condition (and the transfluxor 10$a$ remains blocked) by applying the setting current $I_0$ in the direction of the dotted arrow to the setting winding 42. The amplitude of the setting current is limited so that substantially no flux change is produced in the uppermost narrow leg adjacent the smaller aperture 15$b$. The resultant flux configuration is indicated by the arrows on the transfluxor cores in Fig. 3. Now, when a drive current $I_d$ is applied to the selecting windings 5$a$ and 5$b$, the transfluxor 10$b$ offers a relatively high impedance to the drive current $I_d$. A high impedance is offered because the drive current $I_d$ is in a direction to produce a flux change in the path about the smaller aperture 15$b$. The transfluxor 10$a$, however, still offers a relatively low impedance to the drive current $I_d$ because the narrow leg between its two apertures 15$a$, 24$a$ is already saturated with flux in the sense in which the magnetizing force produced by the drive current $I_d$ tends to increase flux. The drive current $I_d$ divides between the loads $L_2$ and $L_3$ in a manner inversely proportional to the impedances of the transfluxors 10$a$ and 10$b$. While the flux is being reversed in the path about the smaller aperture 15$b$ of the transfluxor 10$b$, the load current $I_2$ in the load $L_2$ is approximately equal to the drive current $I_d$ and the load current $I_3$ in the load $L_3$ is equal to the difference between the drive current $I_d$ and the load current $I_2$. At this time, (2) $$I_2 \cong I_d \text{ and } I_3 \cong 0$$

However, as more and more flux is reversed in the transfluxor 10$b$, the impedance offered to the drive current $I_d$ by the transfluxor 10$b$ becomes less. The load current $I_3$ then increases and the load current $I_2$ correspondingly decreases as the impedance offered to the drive current $I_d$ by the transfluxor 10$b$ decreases. The sum of the load currents $I_2$ and $I_3$, however, is always equal to the drive current $I_d$. In the first mode of operation, the drive current $I_d$ is terminated before the flux reversal in the path about the small aperture 15$b$ of the transfluxor 10$b$ is completed. In the second mode of operation, the drive current $I_d$ is maintained for a time longer than that required to reverse all the flux in the path about the smaller aperture of the transfluxor 10$b$. In the second mode of operation, the load current $I_3$ is continued and becomes substantially equal to the load current $I_2$ when the flux reversal along the path about the smaller aperture 15$b$ of the transfluxor 10$b$ is completed.

Figure 4:
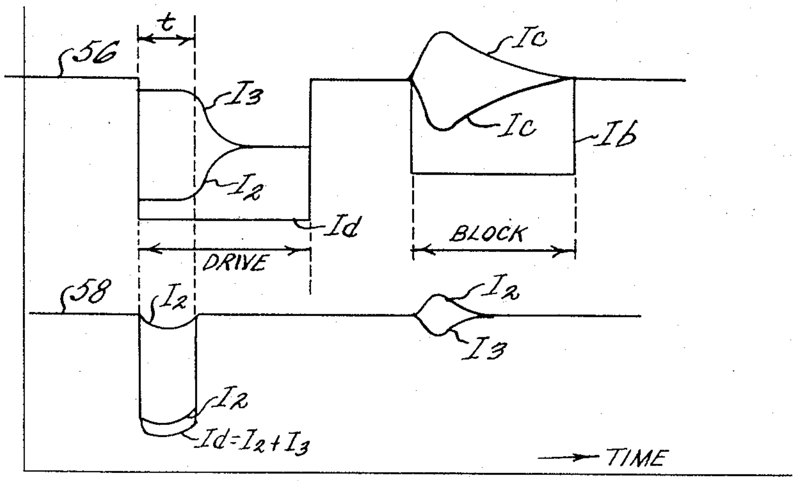
Fig. 4 is a graph of waveforms, all on the same time scale, useful in explaining the operation of the system of Fig. 1.

The waveforms of Fig. 4 illustrate the load currents $I_2$ and $I_3$ produced in the equal loads $L_2$ and $L_3$ when a drive current $I_d$ is applied to a pair of transfluxors when one transfluxor, as the transfluxor 10$b$ of the pair 10, is in a set condition. The waveforms produced when the transfluxor 10$a$ is in a set condition can be obtained by interchanging the subscripts 2 and 3. Note that initially the current $I_2$ is substantially equal to the drive current $I_d$, and the load current $I_3$ is substantially equal to zero, as shown by the upper waveform 56. The load current $I_2$ and the load current $I_3$, respectively, decrease and increase very little as the flux in the path about the smaller aperture 15$b$ of the transfluxor 10$b$ is changing. When substantially all the flux is changed in the path about the aperture 15$b$, of the transfluxor 10$b$, the load current $I_3$ and $I_2$ each become substantially equal to one-half the drive current $I_d$.

When the transfluxor 10$b$ (Fig. 3) is reset by the blocking current $I_b$, a circulating current $I_c$ is produced in the closed loop including the selecting windings 5$a$, 5$b$ and the loads $L_2$ and $L_3$. The circulating current $I_c$ flows only in the closed loop because drive source 26 (Fig. 1) is open-circuited when the blocking current $I_b$ is applied. The circulating current flow in the loads $L_2$ and $L_3$ is indicated in the waveform 56 of Fig. 4 by the equal and opposite polarity currents $I_c$ which occur at the same time as the blocking current $I_b$.

If the drive current $I_d$ is terminated after a time $t$, before the transfluxor 10$b$ is completely switched then substantially all the drive current is directed through the load $L_2$ and substantially none of the drive current $I_d$ is directed through the load $L_3$, as indicated by the lower waveform 58 of Fig. 4. Also, the circulating current $I_c$ which flows when the transfluxor 10$b$ is returned to its blocked condition, is substantially smaller, other things being equal.

In the above example, it is assumed that (1) the amplitude of the drive current $I_d$ is regulated to have a value equal to, or less than, a value which produces spurious unblocking of the transfluxor 10$a$ about the longest path thereof, the path including both its apertures 15$a$, 24$a$, and (2) that the duration of the drive pulse is equal to the time $t$. In any specific system the time $t$ may also be selected within limits. It is understood that, for a given magnitude of drive current, the amount of circulating current decreases with a decrease in the time $t$.

The blocking current $I_b$ may be as large as desired in the system of Fig. 1 because the blocking current $I_b$ and any resulting circulating currents are not in a direction to produce spurious unblocking of a transfluxor. There is, however, a relation between the amplitude of the drive current $I_d$ and the time interval over which "high-discrimination" is obtained. By "high-discrimination" is meant that a substantial portion of the drive current flows in a desired one of a pair of current paths. The relation exists because the rate of flux change in a set transfluxor increases with an increase in amplitude of the drive current. Thus, the interval of high discrimination decreases with an increase in amplitude of the drive current. In order to maintain the maximum amount of discrimination between the currents in a pair of selecting windings, the load should have a relatively low impedance; that is, an impedance of the same order as that of a set transfluxor. A low-impedance load is desired because, in general, the load device should not influence to any great extent the steering of the drive current. For example, with a load comprising switch cores, discriminations of from 10:1 to 20:1 have been achieved. The volume of material included in the path about the smaller aperture of a transfluxor should be of the order of F/K times the volume of material of any one of the switch cores of the switch 3 (Fig. 1), where K is the number of binary inputs to the switch 3. The factor F is a design factor and should be as large as is practicable, considering the loads coupled to the transfluxors and the desired discriminations. In practice, a value $F=5$ has been found to be suitable.

Figure 5:
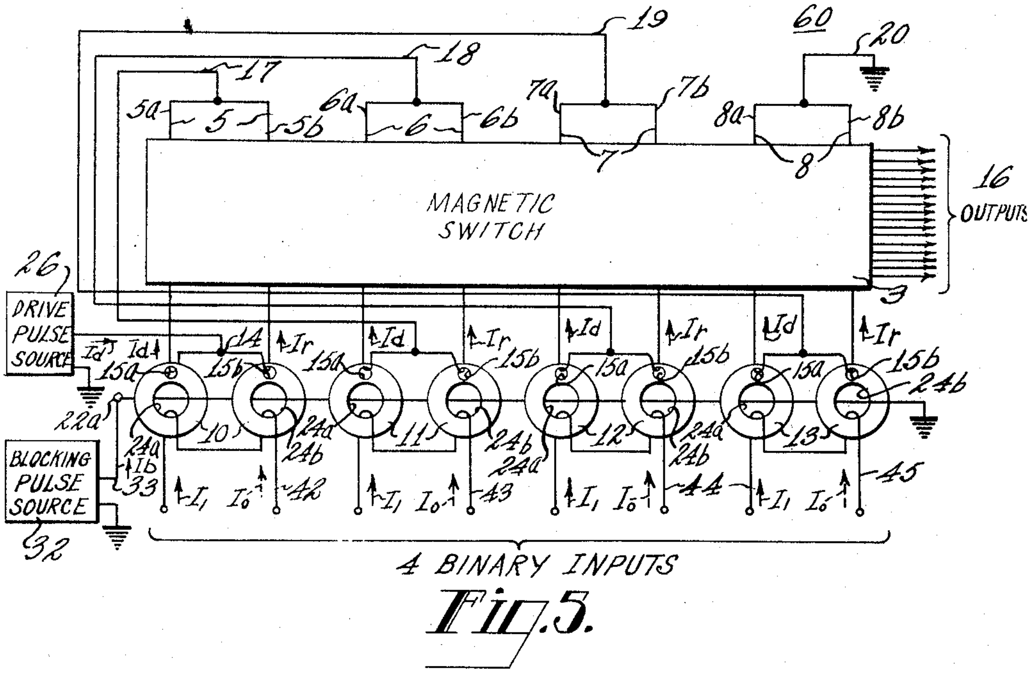
Fig. 5 is a schematic diagram of another embodiment of the invention in which a separate reset winding used in the embodiment of Fig. 1 is omitted.

Another embodiment of the invention is illustrated by the system 60 of Fig. 5. The arrangement of the system 60 of Fig. 5 is similar of the arrangement of Fig. 1 except that the blocking coil 22, after linking each of the transfluxors of the pairs 10–13, is connected directly to the common ground, without linking the switch cores. A separate reset coil is not required for the switch 3. The driven switch core is first driven from its initial state N to the state P and then returned to the state N by the drive current $I_d$.

In the arrangement of Fig. 5, the drive current $I_d$ is of an amplitude larger than that which produces spurious unblocking of those transfluxors which were not set by the binary inputs. The duration of the drive current $I_d$ is made longer than the time required to switch substantially all the flux about the smaller aperture of the set transfluxor in each pair. This is the second mode of operation which may be employed in a system according to the invention.

In operation, assume that each of the right-hand transfluxors 10b–13b of the pairs 10–13 is initially set. When the drive current $I_d$ is applied, the flux in the path about the smaller apertures 15b of the set transfluxors begins to change and most of the drive current $I_d$ is directed through the left-hand winding of each of the pairs 5–8 of selecting windings 6. The drive current $I_d$ is additive in a direction to change a desired one of the switch cores from the initial remanent state N to the state P. The changed switch core produces an output of one polarity on its connected output channel 4.

In the drive current $I_d$ is increased in amplitude, the flux is changed at a faster rate in the right-hand transfluxors 10b–13b. When the drive current $I_d$ reaches a critical amplitude, the flux along the longest path of each of the transfluxors 10a–13a begins changing. The transfluxors 10a–13a then begin to offer an increasing impedance to the drive current. The drive current $I_d$ then begins to divide between the left and the right-hand selecting windings of the pairs 5–8, in accordance with the increasing and decreasing impedances of the left and right-hand transfluxors of the respective pairs 10–13. The resulting current flow in the right-hand selecting windings, the *b* windings, of the pairs 5–8, is designated $Ir$ in Fig. 5. The currents $Ir$ may be slightly larger than the currents in the left-hand selecting windings of the pairs for a relatively short interval of time. After a time required to reverse the flux in all of the transfluxors 10a–13b, the drive current $I_d$ then divides substantially equally between the two selecting windings of each of the pairs 5–8. The currents $Ir$ in the right-hand selecting windings 5b–8b are additive in the couplings to the one driven switch core of the switch 3, in the direction to return this previously driven switch core to the N remanent state. When this switch core is changed back to the state N, an opposite polarity output is produced on its connected output channel 4. Any driven switch core is returned automatically to the N state when the drive current is equal in both selecting windings of a pair because of the manner of linkage of the selecting coils to the switch cores. For example, consider a switch 3 having K windings in the P direction, and K windings in the N direction on each of the switch cores, where K is equal to the number of binary inputs. However, a winding in the N direction has a number of turns equal to (K−1) times the number of turns of a winding in the P direction, as described for the system of the abovementioned Rajchman article. Consequently, when any substantial portion of the drive current $I_d$ is directed through the right-hand selecting windings 5b–8b of the pairs 5–8, the driven switch core is automatically returned to the N state, because these right-hand windings are the N direction windings on the driving switch core to be returned. The drive current is maintained for the time required to produce a flux reversal in each transfluxor of the pairs 10–13. Thus, at this point it may be said that two features are characteristic of the second mode of operating a switching system according to the invention; that is, (1) the amplitude of the drive current $I_d$ may have any arbitrarily large value and long duration, and (2) the drive one of the switch cores is automatically reset during the drive operation.

A subsequent blocking current $I_b$, in the arrangement of Fig. 5, produces a flux change in the longest path, the path about both the apertures 24a and 15a, of each of the left-hand transfluxors 10a–13a and also a flux change in the path about the blocking aperture 24a of each of the right-hand transfluxors 10b–13b. These separate flux changes in the pairs 10–13 of the transfluxors induce opposite-polarity voltages in the corresponding pairs 5–8 of selecting windings. Accordingly, there is substantially no circulating current produced in the closed loops including the pairs of selecting windings. Therefore, the operation of the system of Fig. 5 may be faster than that of Fig. 1 and is essentially limited only by the characteristics of the magnetic material. One reason increased speed is obtained is because the magnetizing force produced by the blocking current $I_b$ is not opposed by magnetizing forces produced by circulating currents.

The drive current $I_d$ may also be used to return the driven switch core of the switch 3 of Fig. 1 back to the N state in a similar manner. Thus, suppose the duration of the drive current $I_d$ is made sufficiently long, so that the drive current is directed first through one and then through the other path of the two paths of the respective pairs 5–8. Then a desired swich core is successively driven from the state N to the state P and is then returned to the state N. Accordingly, if desired, the blocking coil 22 need not link the switch cores of the switch 3.

Figure 6:
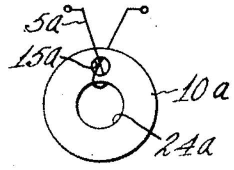
Fig. 6 is a schematic diagram illustrating a preferred manner of coupling a current path to one of the transfluxors of Figs. 1 and 5.

It is understood that, in the embodiments of the systems of Figs. 1 and 5, multi-turn windings may be linked to the transfluxors, if desired or necessary. The schematic diagram of Fig. 6 illustrates one manner of coupling a selecting winding to a transfluxor. Thus, for example, the transfluxor 10a may have the selecting winding 5a linked in "figure-eight" fashion through both its apertures. With such a winding arrangement, the net ampere-turns acting on the flux path about the smaller aperture 15a, when a drive current $I_d$ is applied, is equal to a value of 2 $NI_D$ where N is the number of turns of the "figure-eight" winding 5a. However, the flux path about both the apertures 15a and 24a, which is the path taken by any spurious unblocking, has only a net magnetizing force of 1 $NI_D$ ampere-turns acting thereon. Accordingly, the discrimination of the system is increased because only one-half the effective ampere turns of the magnetizing force produced by the drive current tends to spuriously unblock the non-set one of the transfluxors of a pair. All of the other transfluxors may be similarly coupled.

Figure 7:
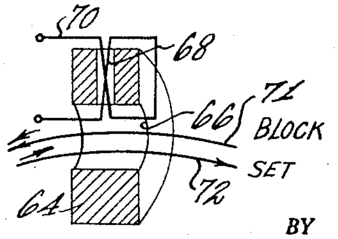
Fig. 7 is a view, in section, of another two-apertured transfluxor having the two apertures located orthogonal to each other and which may be used in the systems of Figs. 1 and 5.

Another advantageous arrangement of a transfluxor for a switching or decoding system is shown in Fig. 7. In Fig. 7, there is illustrated half of a transfluxor 64 divided by a plane including the axes of its blocking aperture 66 and its output aperture 68. The remaining portion of the transfluxor 64 is symmetrical to the portion shown. The output aperture 68 of the transfluxor has its axis orthogonal to the axis of the blocking aperture 66 and is located in the center portion of the section of material. The blocking winding 71 and a setting winding 72 are each wound through the blocking aperture 66. A selecting winding 70 is linked in "figure-eight" fashion through the output aperture 68 and through the blocking aperture 66.

A transfluxor, arranged as is the transfluxor 64, does not produce any outputs in the selecting winding 70 when it is placed in a set condition by a suitable current applied to the setting winding 72. This is so because the equal flux changes in the portions of material linked by the selecting winding 70 induce equal and opposite polarity voltages therein. Thus, substantially no circulating current flows when the transfluxor 64 is placed in its set condition.

There has been described herein improved switching and decoding systems using magnetic elements of one kind for controlling the selection of magnetic elements of another kind. The one kind of magnetic element may be two-aperture transfluxor devices, one in each of a plurality of sets of current paths linked to the elements of the other kind, and the other kind of magnetic elements may be single-aperture magnetic cores. Two arrangements of a system according to the invention have been described. In one arrangement a separate reset coil is linked to the one kind of elements. In the other arrangement the selected element is automatically reset to its initial remanent state by regulating the amplitude and duration of the drive current applied to a series circuit including the sets of current paths.

Other known magnetic switches than the one exemplified in the systems of Figs. 1 and 5 may be used. These known switches differ primarily in the manner of linkage of the current paths to the switch cores. For example, switches having selecting windings arranged as in the switches described in the aforementioned Rajchman et al. Patent No. 2,691,153 may be used, or switches having additional compensation cores in each switch position may be used.

What is claimed is:

1. A magnetic system comprising first and second magnetic cores each of substantially rectangular hysteresis loop magnetic material and each having a plurality of apertures in said material, said cores each having first and second response conditions respectively corresponding to relatively high and low impedance levels, a parallel circuit including first and second branch circuits connected in parallel with each other, each of said branch circuits linking a different one of said cores through one of its apertures, means for setting one of said cores to said first response condition and the other of said cores to said second response condition, said means including windings linked through another aperture of each of said cores, whereby a signal applied to said parallel circuit is directed through said second branch circuit while said first core is in said first response condition, and means for resetting said cores to one of said response conditions.

2. A magnetic system comprising first and second magnetic cores each of substantially rectangular hysteresis loop magnetic material and each having a plurality of apertures in said material, said cores each being characterized by having a plurality of response conditions to applied signals, a parallel circuit including first and second branch circuits connected in parallel with each other, each of said branch circuits including a different one of said cores, means including winding means linked through an aperture of each of said cores for setting said first and second cores selectively either to the same or to different response conditions, whereby a signal applied to said parallel circuit divides substantially equally between said branch circuits when said cores are in the same response condition, and substantially all said signal is directed in either said first or said second branch circuit when said cores are in different response conditions, and means for resetting each of said cores to one of said response conditions.

3. A magnetic system comprising first and second magnetic cores each of substantially rectangular hysteresis loop magnetic material and each having a plurality of apertures in said material, each of said cores having a plurality of separate flux paths, a parallel circuit including first and second branch circuits connected in parallel with each other, each of said branch circuits being linked to first and second flux paths of a different one of said cores, said first flux path of a core being substantially longer than the second flux path of a core, means for setting the flux in said first and second paths in desired directions, means for applying a signal to said parallel circuit, said signal being directed in said branch circuits in accordance with the flux directions set in said first and second flux paths of said cores, and means for resetting the flux in said paths.

4. In a magnetic system as claimed in claim 3, wherein the amplitude of said applied signal is insufficient to cause a flux change along the second flux path of either one of said cores.

5. In a magnetic system as claimed in claim 3, wherein the amplitude of said applied signal is made sufficient to cause a flux reversal along both said first and said second flux paths of each of said cores.

6. A magnetic system comprising first and second magnetic cores, each of said cores being of substantially rectangular hysteresis loop magnetic material and each having a plurality of separate flux paths in said material, a first of said flux paths having two portions respectively in common with two other flux paths, means for establishing the flux in said common portions of said first flux path either in the same or in different directions, a parallel circuit including first and second branch circuits connected in parallel with each other, each of said branch circuits being linked to a first flux path in a different one of said cores, and means for applying a signal to said parallel circuit, said signal being directed in either said first or said second branch circuit in accordance with the directions in which the flux is established in the respective first flux paths of first and second cores.

7. A magnetic system comprising two magnetic cores each capable of assuming stable remanence conditions and each linked by a different one of a pair of windings, a pair of magnetic elements each characterized by having a substantially rectangular hysteresis loop and each having at least two apertures, said pair of windings being connected in parallel with each other through only one aperture in each of said pair of elements, a setting winding linked through another aperture of each element of said pair of elements for receiving setting signals of either the one or the other polarity, whereby current applied to said pair of windings is directed through either the one or the other winding of said pair in accordance with the polarity of a previously received setting signal to effect selection of one of said cores, and a blocking coil linked through said other apertures of both said elements.

8. A magnetic system comprising first and second magnetic cores each of substantially rectangular hysteresis loop material and each having a plurality of apertures located parallel to one another in said material, each of said cores being settable selectively to different ones of a plurality of response conditions by different ones of a plurality of setting signals applied through a first of the apertures thereof, a parallel circuit including first and second branch circuits connected in parallel with each other, each of said branch circuits being linked through a second aperture of a different one of said cores, whereby a signal applied to said parallel circuit is directed in said branch circuits in accordance with the response conditions of said cores, and means for resetting said cores to a desired one of said response conditions.

9. A system for steering a current in a desired one of a plurality of current paths connected in parallel between two junction points, said system comprising a plurality of multiapertured cores of substantially rectangular hysteresis loop material, each of said paths being linked to a different one of said cores through a pair of its apertures, said cores each having two response conditions, one of said response conditions corresponding to a "fully-on" condition, wherein substantial flux changes are produced in a core by a current flowing in the current path linked to that core, and another of said response conditions corresponding to a "fully-off" condition wherein substantially no flux change is produced in a core by a current flowing in the path linked to that core, said current being steered through desired ones of said paths in accordance with the said response conditions of said cores, and first and second windings linked through another aperture in each of said cores for establishing said cores in desired ones of said response conditions.

10. A magnetic system comprising a plurality of magnetic elements each capable of assuming stable remanence conditions, a series circuit including a plurality of sets of parallel current paths linked to said elements in a desired combinatorial fashion, said paths of a set being in parallel with each other and said sets being connected in series with each other, a plurality of control devices, each of said control devices including a core of substantially rectangular hysteresis loop magnetic material, each said control device having a plurality of apertures in said material, each said current path being linked through at least one of said apertures of a different one of said control devices, means for applying selectively setting signals to one or more but less than all the said control devices in each of said sets of paths, said control devices receiving said setting signals operating to direct a current applied to said series circuit through desired ones of said paths and means for applying reset signals to all said cores.

11. A magnetic system comprising a plurality of sets of parallel current paths, the said paths of a set being in parallel with each other, a series circuit including said sets of paths connected in series with each other, a plurality of control devices, each of said control devices including a core of substantially rectangular hysteresis loop magnetic material and each said core having a plurality of apertures located parallel to each other in said material, each of said paths being linked to a different one of said cores through one of said plurality of apertures thereof, and means for applying selectively setting signals to one or more but less than all the said control devices in each of said sets of paths, said means including a plurality of winding means, each of said winding means being linked to a different one of said cores through another of said plurality of apertures thereof, whereby a signal applied to said series circuit is directed through desired ones of said paths in accordance with said setting signals, and further winding means linked to all said cores through said other apertures for resetting said cores.

12. A magnetic system comprising a plurality of magnetic elements each capable of assuming stable remanence conditions, a series circuit including a plurality of sets of parallel current paths linked to said elements in a desired combinatorial fashion, a plurality of control devices of which a different one is in each of said paths for controlling current flow in said paths, each of said control devices having a plurality of response conditions, and each of said control devices including a core of substantially rectangular hysteresis loop material having a plurality of apertures in said material, each path being linked to a different control device through one of said plurality of apertures thereof, means for operating selectively certain of said control devices from one to another of said response conditions, said certain control devices operating to steer a current applied to said series circuit through one or more but less than all of the paths in each of said sets, and means for returning said certain devices to said one response condition.

13. A magnetic system comprising magnetic core elements and magnetic transfluxor elements, each said core element being capable of assuming stable remanence conditions, and each said transfluxor element being of substantially rectangular hysteresis loop material, pairs of parallel current paths linked to different groups of said core elements and individually linked to individual ones of said transfluxor elements, setting windings linked respectively to pairs of said transfluxor elements, a blocking coil linked to each of said transfluxor elements and to each of said core elements, and means connecting said pairs of parallel paths in series the one to another, said magnetic transfluxor elements operating to steer a current applied to said series circuit through one path in each of said pairs to effect selection of at least one core element in accordance with a combination of signals separately applied to said setting windings.

14. A magnetic system comprising up to $2^K$ magnetic cores each capable of assuming stable remanence conditions, K pairs of windings linked in a desired combinatorial fashion to said magnetic cores, K pairs of magnetic elements each characterized by having a substantially rectangular hysteresis loop and each having at least two apertures, each two windings of a pair being connected in parallel with each other, and each of said windings being linked to a different one of said elements through both said apertures, K setting windings for receiving K setting signals, each of said setting windings being linked to both the elements of a different one of said winding pairs, a blocking coil linked to all said elements, and a series circuit including in series said K pairs of windings, whereby a current applied to said series circuit is directed through one or the other windings in each of said pairs in accordance with said setting signals.

15. A magnetic system comprising a plurality of magnetic elements each capable of assuming stable remanence conditions, a series circuit including a plurality of sets of parallel current paths linked to said elements in a desired combinatorial fashion, a plurality of control devices a different one in each of said paths, each of said control devices including a core of substantially rectangular hysteresis loop material having at least two apertures in said material, each of said paths being linked through a first aperture of a different one of said control devices, a plurality of setting coils, each of said setting coils being linked through a second aperture of each control device in a different one of said sets of paths, a blocking coil linked through said second aperture of each said control device, means for applying selectively setting signals to said setting coils, and means for applying a selecting signal to said series circuit, said selecting signal being steered through one or more but less than all of said paths in each of said sets in accordance with said applied setting signals.

16. A magnetic system as claimed in claim 15, wherein said first and second apertures are located in said material with their axes substantially parallel to one another.

17. A magnetic system as claimed in claim 15, wherein said first and second apertures are located in said material with their axes substantially orthogonal to one another.

18. A magnetic system comprising a plurality of magnetic elements each capable of assuming stable remanence conditions, a series circuit including a plurality of sets of current paths linked to said elements in a desired combinatorial fashion, a plurality of control devices a different one in each of said paths, each of said devices having relatively high and relatively low-impedance conditions to current flow in its path, and each of said devices including a magnetic core of substantially rectangular hysteresis loop material having a plurality of apertures located parallel to each other in said material, a different one of said paths being linked to a different one of said devices through a pair of said apertures thereof, means to set said devices of each set of paths to desired response conditions, means for applying a signal to said series circuit, said signal being directed in desired paths of each set of paths in accordance with the response conditions of said devices and a blocking coil linking all said devices through one of said pair of apertures.

19. A magnetic system comprising a plurality of magnetic elements, each of said elements having two remanent states, a plurality of sets of current paths, each set of paths being linked to a different group of said elements, said paths of a set being in parallel with each other and said sets of paths being connected to each other in a series circuit, a plurality of control devices a different one in each of said paths, each of said devices including a core of substantially rectangular hysteresis loop material having a plurality of apertures in said material, each different path being linked to a different device through one of said plurality of apertures thereof, and means for applying a current to said series circuit, said current being steered through one or more but less than all of said paths in each of said sets under the control of said devices, said applied current initially changing one of said elements from one of said remanent states to the other under the control of certain of said control devices and said current returning said changed element to said one remanent state under the control of each of said control devices and a blocking coil linking all said devices exclusively through other apertures of said devices.

20. A magnetic system comprising two magnetic cores each having two remanent conditions, a pair of windings each linked to a different one of said cores, a pair of magnetic elements each of substantially rectangular hysteresis loop material and each having at least two apertures in said material, each of said elements having a plurality of response conditions, said pair of windings being connected in parallel with each other through one aperture in each of said pairs of elements, a setting winding linked through another aperture of each element of said pair of elements for receiving setting signals of either the one or the other polarity, said setting signals operating to change either one or the other of said elements from one of said response conditions to another of said response conditions, and a blocking winding linked through said other aperture of each element of said pair of elements and linked to each of said two cores for receiving blocking signals, said blocking signals operating to reset each of said elements to said one response condition and each of said cores to one of said two remanent conditions, whereby a signal applied to said pair of windings is directed through either one or the other winding of said pair of windings in accordance with the response conditions of said elements to effect selection of either the one or the other of said cores.

References Cited in the file of this patent

UNITED STATES PATENTS

| | | |
|---|---|---|
| 2,709,798 | Steagall | May 31, 1955 |
| 2,710,952 | Steagall | June 14, 1955 |
| 2,733,424 | Chen | Jan. 31, 1956 |

OTHER REFERENCES

"Magnistor Circuits" (Synder), Electronic Design, August 1955, pp. 24–27.

"The Transfluxor" (Rajchman), Proceeding of the IRE, vol. 44, issue 3, pages 321–332, March 1956.

"A New Nondestructive Read for Magnetic Cores" (Thorensen), 1955.

Western Joint Computer Conference, March 1955, pages 111–116 (Figs. 3 and 5, page 113 relied on).